United States Patent Office 2,740,950
Patented Apr. 3, 1956

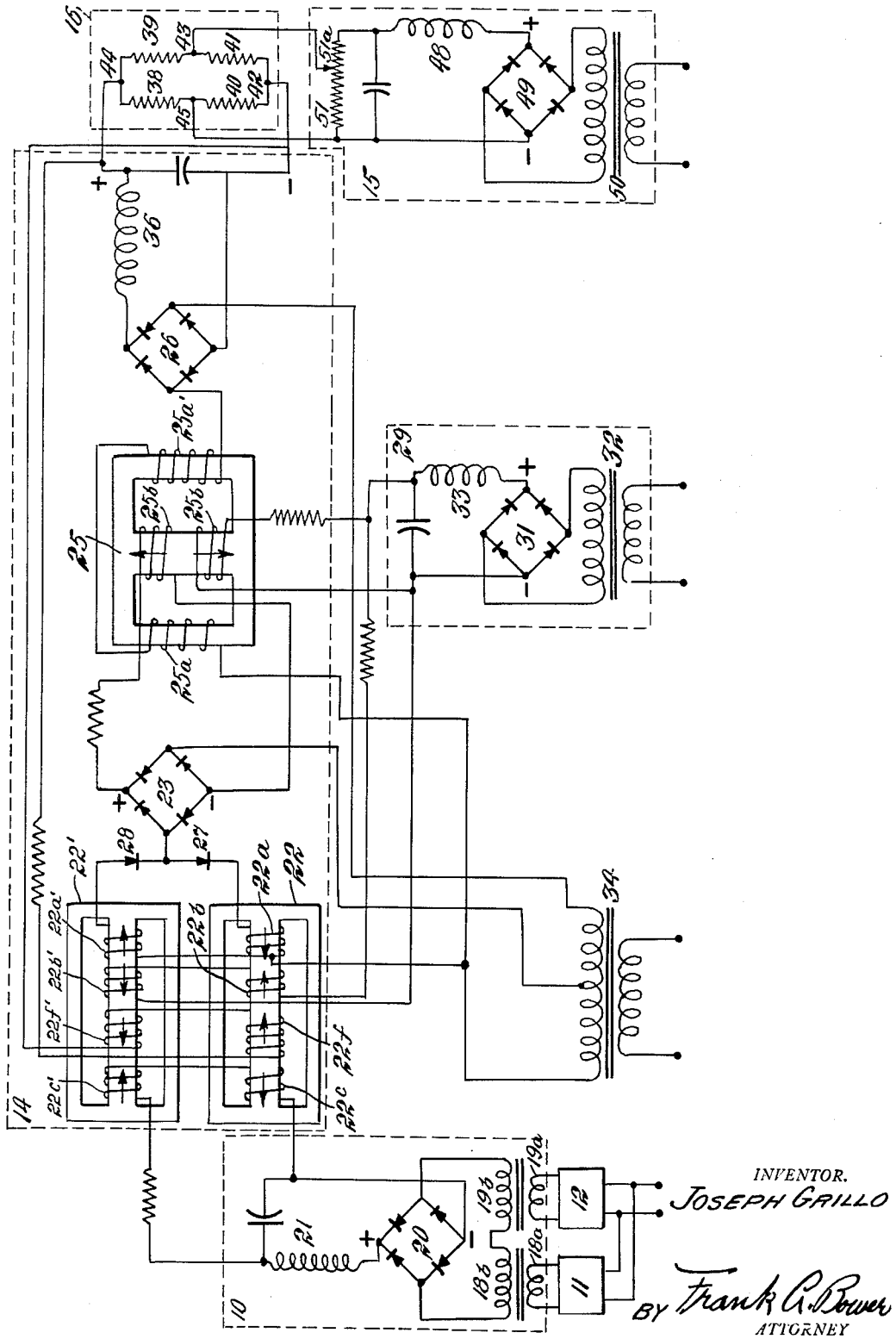

2,740,950

CONVERSION OF REVERSIBLE PHASE A. C. SIGNAL TO REVERSIBLE POLARITY D. C. SIGNAL

Joseph Grillo, New York, N. Y., assignor to Ward Leonard Electric Company, a corporation of New York Application July 24, 1952, Serial No. 300,685

5 Claims. (Cl. 340—178)

This invention relates to an electrical conversion circuit and is particularly applicable to electrical regulating and control circuits in which the initiating control circuit has an alternating output signal and the load circuit is responsive only to a direct current signal.

The object of this invention is to provide an electrical circuit for converting an alternating signal of reversible phase and variable amplitude into an amplified direct signal of reversible polarity.

Another object of the invention is to provide an electrical circuit that has a direct voltage output signal directly proportional to the input signal in magnitude and reversing in polarity with reversal in phase of the input signal.

Another object of the invention is to provide a conversion circuit with a single ended amplifier.

Other and further objects will be apparent from the following description taken in connection with accompanying drawings.

In the embodiment shown and described the input circuit 10 receives an alternating control signal from the control circuit 11 and an alternating reference voltage from the alternating source 12. The source 12 also supplies the control circuit 11 with an alternating signal so that the output of the control circuit and the alternating source are of the same frequency. The control circuit 11 varies the alternating signal in amplitude and may shift the phase of the reference signal from an in phase relation with the reference voltage to a 180 degree phase relation with the reference voltage. When in either phase relation the phase remains constant.

The control signal with these amplitude variations and phase reversal is added to the alternating voltage in the input circuit and the resultant is rectified to a direct current signal variable between a maximum and minimum voltage of the same polarity. This direct current output signal is amplified in the two stage amplifier 14 and impressed on the ring modulator 16. In the ring modulator the amplified signal is combined with a direct reference voltage from the reference circuit 15 to produce an output signal variable between a maximum positive value and a minimum negative value. The output signal is used to control the load circuits connected to 39 and 40.

The output of the amplifier is fed to the ring demodulator 16 which subtracts out that portion of the amplified direct current which originated from the alternating reference source 12. This leaves only the amplified direct current, which originated from the alternating signal from the control circuit 11. This signal output appears across load resistors 39 and 40 and is proportional to the magnitude of the signal. The signal output will have a positive or negative polarity dependent upon whether a 180° phase reversal has taken place in the signal. Auxiliary supply circuits are provided to supply power to the amplifier and ring demodulator. Anode supply transformer 34, and bias supply circuit 29 provide the amplifier with external power, and the demodulator supply 15 provides the ring demodulator with reference power.

The control circuit 11 and the alternating reference circuit 12 provides the input circuit 10 with an alternating signal and reference. The alternating signal may vary in magnitude and may reverse phase by 180°, such as the signal which is commonly derived from the output of a synchro control transformer. The phase of the signal must remain relatively constant excepting for the 180° reversals. It is required that the signal and reference circuits be powered from a common alternating source in such a manner that the phase relation of the two circuits is always fixed excepting for phase reversals of 180°. If a permanent phase shift is encountered in the signal circuit, a corresponding phase shift must be introduced into the reference.

Considering the conversion circuit in greater detail the alternating control signal and the alternating reference voltage are combined in the secondaries of transformers 18 and 19 of the input circuit 10. The primary windings 18a, 19a are connected to the control circuit 11 and the source 12 respectively. The secondary windings 18b and 19b are connected in series and combine the signal with the reference voltage. The alternating reference or source voltage has an amplitude greater than the largest amplitude of the control signal and may be compensated for any phase shift through the signal source. The bridge rectifier 20 is connected across the windings 18b, 19b and rectifies the net signal to produce a direct voltage between minimum values of the same polarity. The output of the rectifier is connected to the input of the amplifier 14 through the filter 21.

The primary 18a of the signal transformer and the primary 19b of the reference transformer are isolated providing signal and reference isolation. The secondary 18b of the signal transformer and the secondary 19b of the reference transformer are connected in series. This provides electrical mixing of the output voltages from the signal and reference circuits. The turns of the reference transformer 19 are so apportioned that the reference voltage will always be greater in magnitude than the maximum possible signal voltage. In this manner the signal voltage may be varied in magnitude or by 180° phase reversal and yet will always add or subtract from the larger reference voltage without reversal of the phase of the net voltage. This net voltage from the signal and reference circuits is rectified to a direct current signal by rectifier 20, the direct current output of which is filtered by the "L" section, choke input, filter 21. This direct current signal will be variable between a maximum and minimum voltage, but will never reverse polarity. The mean of these variations will correspond to an input signal of 0, while signals in phase with the reference will result in direct currents above the mean, and those shifted in phase 180° will result in currents below the mean. The signal has now been converted to a variable direct current which is directly related to the nature of the input signal.

The magnetic amplifier 14 has two stages of amplification with a feedback from the output of the amplifier to the first stage. The response of the amplifier is very linear over the operating range which is from an input voltage equal to the difference of the control voltage and the reference voltage to an input voltage equal to the sum of the two voltages. The first stage comprises saturable reactors 22, 22' with a bridge rectifier 23 in the output and the second stage comprises a saturable reactor 25 with a bridge rectifier 26. The saturable reactors may be of the conventional three legged shell type with the bias and control windings on the center leg and the anode windings on the outer legs or may consist of two separate reactors as shown in this embodiment. The anode windings 22a and 22a' of the reactors 22, 22' are respectively connected in series with the rectifiers 27, 28 to impress an alternating current across the rectifier 23. The control windings 22c, 22c' are connected to the output of circuit 10 through a limiting resistor and vary the flux of the reactors and the output control signal in accordance with the impressed signal.

The second stage reactor 25 may be of the shell type with anode windings 25a, 25a' connected in series in push-pull relation and impress an alternating current across the rectifier 26 the direct current output of which is filtered by an L section and choke input filter 36. The control winding of the reactor 25c is coupled across the output of the first stage through a limiting resistor, and varies the flux of the reactor and the output control signal in accordance with the signal received from the first stage. A bias winding 25B positions the flux of the reactor to the proper value. Anode windings 22a, 22a' and 25a, 25a' are supplied with alternating current through the transformer 34. The bridge rectifier 26 is connected in series with the anode winding 25a, 25a' across the secondary of the transformer 34. The output of the rectifier is connected to the ring modulator 16 through the filter 36. The control winding 25c' is coupled across the rectifier 23 to receive the amplified input signal.

The anode windings 22a, 22a' and the first stage output rectifier 23 are connected across a portion of the secondary of the transformer 34. The feedback winding 22f is connected across the output condenser 36a to feed back a portion of the output. This increases the linearity and accuracy of the response of the amplifier. A bias circuit 29 provides the bias windings with a direct current to set the first and second stage amplifiers in their proper operating range. The bias circuit comprises a full wave bridge rectifier 31 supplied with alternating current through the transformer 32. The windings 22b and 22b' and 25b are connected in parallel across the output filter 33.

This auxiliary bias supply circuit 29 comprises a supply transformer 32 with a secondary feed bridge rectifier 31, the direct current output of which is filtered by the L section, choke input, filter 33. The auxiliary bias supply circuit provides the bias windings of the amplifier with the direct current to position the first and second stage output currents to their proper operating level when zero signal is present. A feedback circuit connects the output of the second stage to the feedback winding 22F, 22F' of the first stage through a limiting resistor. This circuit feeds back a portion of the output of the amplifier in a negative manner to increase the linearity and accuracy of response of the amplifier.

The output signal of the amplifier follows the input signal and varies between a maximum and minimum value of the same polarity. This output signal is combined with a direct reference voltage of the reference circuit 15 in the ring modulator 16 to produce a direct output signal reversible in polarity in the loads 39 and 40. The ring modulator has four terminals 42, 43, 44, 45 with four resistors 38, 39, 40, 41 of equal resistance connected between the terminals. The output of the amplifier 14 is connected to the terminals 42, 44 and the reference circuit is connected to the terminals 43, 45. The resistors are connected in a bridge formation with the amplifier connected across one diagonal and the reference circuit connected across the other diagonal. The output signals are taken from across the resistors 39 and 40 connected between terminals 43, 44 and 42, 45 respectively.

The ring demodulator mixes the two input voltages in such a manner that the inputs add in resistors 38 and 41 and subtract in resistors 39 and 40 since it is desired to subtract the reference from the signal subtractings. Resistors 39 and 40 comprise the load of the circuit. These will carry a direct current which is porportional to the signal.

The output of the direct reference circuit is set by the adjustable resistor 51 to a value to cancel the effect of the alternating reference voltage impressed on the primary winding 19a of the input transformer. The output is adjusted by the potentiometer 51 to exactly equal the output signal of the amplifier when the amplifier is fed a zero signal from the signal circuit through the input circuit 10. The direct reference voltage is in opposition to the output voltage of the amplifier and when the control signal is zero the output of the ring modulator appearing across resistors 39 and 40 is zero, thus the output of the circuit is proportional to the changes of the control signal. The application of signal to the amplifier then results in a positive or negative output in load resistors 39, 40. This output will be proportional to the magnitude of the signal from the signal circuit 11 and will be positive or negative in response to the phase of the signal with respect to the alternating reference voltage.

The direct voltage reference circuit comprises a full wave bridge rectifier 49 and an input transformer 50 connecting rectifier 50 to the source 12. The rectifier is connected to the adjustable resistor 51 through the filter network 48 and provides a direct voltage larger than the direct reference voltage. The tap 51a is adjusted to provide the desired reference voltage.

Load circuits can be connected to either or both resistors 39 and 40. High impedance loads may be connected across the resistors. Low impedance loads may be connected in series with the load resistors provided the value of resistance included between the junction points 43, 44 and 42, 45 are kept equal or in the proper proportions.

The load circuit may be any type of controlled device responsive to a direct voltage of reversible polarity such as an electric motor, polarized relay, electronic circuit or control coil.

Various modifications and changes may be made in the circuit without departing from the scope of the invention. The ring modulator may have a rectifier and three resistors instead of four resistors or in each leg a rectifier and filter circuit instead of resistors in each leg may be preferred for better accuracy of response.

I claim:

1. An electric conversion circuit comprising means for comparing an alternating control signal varied in amplitude and reversed in phase with an alternating reference signal having an amplitude slightly greater than the maximum amplitude of said signal to produce a direct signal varying between a maximum and minimum voltage of the same polarity, single-ended amplifying means connected to said first means for amplifying said signal, means for combining the output signal of said amplifier and a direct reference voltage having a value to cancel the effect of said alternating reference voltage so that the output signal of said circuit is proportional to said alternating control signal and a polarity corresponding to the phase of said control signal.

2. An electrical circuit comprising a reference source providing an alternating reference signal, a control circuit connected to said source to produce a signal having a phase shift and amplitude difference in relation to said alternating reference signal, an input circuit connected to said source and said control circuit for combining the signal from said control circuit and the signal from said source to produce a direct current variable between a minimum value and a maximum value of the same polarity, a single ended magnetic amplifier circuit connected to said input circuit for amplifying said direct current and passing current of only one polarity, a second reference circuit having a constant direct voltage having a value to cancel the effect of said alternating reference signal, a ring modulator connected to the output of said amplifier circuit to combine the currents from each circuit to produce a direct current reversing in polarity on reversal of phase of the alternating signal and having a value proportional to the amplitude of the signal.

3. An electrical circuit comprising a reference source providing an alternating signal, a control circuit connected to said source to produce a signal having a phase shift and amplitude difference in relation to said alternating signal, an input circuit having rectifier and a transformer with two primary windings connected to said source and said control circuit and a secondary winding connected to said rectifier to convert said control circuit signal into a direct signal variable between a minimum value and a maximum value of the same polarity, a single ended amplifier circuit for passing current of one polarity and connected to said input circuit for amplifying said direct current, a second reference circuit having a constant direct voltage having a value to cancel the effect of said alternating reference signal, a ring modulator connected to the output of said amplifier circuit to combine the currents from each circuit to produce a direct current reversing in polarity on reversal of phase of the signal and having a value proportional to the amplitude of the signal.

4. An electrical circuit comprising a reference source providing an alternating signal, a control circuit connected to said source to produce a signal having a phase shift and an amplitude different in relation to said alternating signal, an input circuit connected to said source and said control circuit for the signal current from said control circuit and the signal from said source to produce a direct current variable between a minimum value and a maximum value of the same polarity, a single ended amplifier circuit connected to said input circuit for amplifying said direct current, a second reference circuit having a constant direct voltage having a value to cancel the effect of said alternating reference signal, a ring modulator with four elements connected in a bridge arrangement with the output of the amplifier connected across one diagonal and the output of the reference circuit connected across the other diagonal to produce a voltage across one of said elements reversing in polarity on reversal in phase of the alternating control signal and having a value proportional to the amplitude of the control signal.

5. An electrical circuit adapted to be connected to a source producing an alternating current reference signal having a constant amplitude comprising a control circuit for producing a signal of the same frequency as said reference signal and having a phase shift and an amplitude less than said reference signal conversion means adapted to be connected to said source to receive said reference signal and connected to said control circuit to receive said control signal for combining said reference signal and said control signal to produce a direct signal variable between a minimum value and a maximum value of the same polarity, single ended amplifier means passing current of only one polarity and connected to said conversion means for amplifying said direct single polarity signal, a reference circuit adapted to produce a direct voltage having a value to cancel the effect of said alternating reference signal, means for combining said direct signal with said direct voltage to produce a direct output current reversing in polarity on reversal of phase of said control signal and having a value proportional to the amplitude of the control signal.

References Cited in the file of this patent

UNITED STATES PATENTS

| | | |
|---|---|---|
| 2,021,099 | Fitz Gerald | Nov. 12, 1935 |
| 2,129,920 | Fitz Gerald | Sept. 13, 1938 |
| 2,400,571 | Olesen | May 21, 1946 |
| 2,421,420 | Hathaway | June 3, 1947 |
| 2,478,363 | Boosey | Aug. 9, 1949 |

FOREIGN PATENTS

| | | |
|---|---|---|
| 466,874 | Canada | July 25, 1950 |